US 12,470,344 B2

(12) United States Patent
Lin

(10) Patent No.: US 12,470,344 B2
(45) Date of Patent: Nov. 11, 2025

(54) METHOD FOR SIDELINK TRANSMISSION PARAMETER DETERMINATION, USER EQUIPMENT, AND COMPUTER READABLE MEDIUM

(71) Applicant: GUANGDONG OPPO MOBILE TELECOMMUNICATIONS CORP., LTD., Dongguan (CN)

(72) Inventor: Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 355 days.

(21) Appl. No.: 17/728,717

(22) Filed: Apr. 25, 2022

(65) Prior Publication Data

US 2022/0255699 A1    Aug. 11, 2022

Related U.S. Application Data

(63) Continuation of application No. PCT/CN2020/131914, filed on Nov. 26, 2020.

(60) Provisional application No. 62/940,388, filed on Nov. 26, 2019.

(51) Int. Cl.
*H04L 5/00* (2006.01)
*H04W 52/28* (2009.01)
*H04W 64/00* (2009.01)
*H04W 92/18* (2009.01)

(52) U.S. Cl.
CPC ......... *H04L 5/0051* (2013.01); *H04W 52/282* (2013.01); *H04W 64/006* (2013.01); *H04W 92/18* (2013.01)

(58) Field of Classification Search
CPC .............. H04L 5/0051; H04L 1/0009; H04W 52/0258; H04W 72/51; H04W 64/006; H04W 52/282; H04W 52/0254; H04W 92/18; H04W 4/025; H04W 52/38; H04W 72/23; H04W 76/14; H04W 72/20; Y02D 30/70
See application file for complete search history.

(56) References Cited

U.S. PATENT DOCUMENTS

| | | | |
|---|---|---|---|
| 2017/0273128 A1* | 9/2017 | Abedini | H04W 76/14 |
| 2018/0167989 A1* | 6/2018 | Yasukawa | H04W 92/18 |
| 2020/0145799 A1* | 5/2020 | Baghel | H04L 1/0018 |
| 2020/0337096 A1* | 10/2020 | Zhang | H04W 72/0466 |
| 2021/0022035 A1* | 1/2021 | Lee | H04W 74/002 |

(Continued)

FOREIGN PATENT DOCUMENTS

| | | |
|---|---|---|
| CN | 107046457 A | 8/2017 |
| CN | 109905918 A | 6/2019 |

(Continued)

OTHER PUBLICATIONS

International Search Report issued in corresponding International Application No. PCT/CN2020/131914, mailed Feb. 26, 2021, 17 pages.

(Continued)

*Primary Examiner* — Oussama Roudani
(74) *Attorney, Agent, or Firm* — BAYES PLLC

(57) ABSTRACT

A method, a User Equipment, a computer program and a computer readable medium for SideLink (SL) transmission parameter determination.

11 Claims, 1 Drawing Sheet

(56) References Cited

U.S. PATENT DOCUMENTS

2021/0400739 A1* 12/2021 Nakano .................. H04M 11/00
2022/0132344 A1*  4/2022 Zhou ..................... H04W 24/08
2022/0240321 A1*  7/2022 Cao ................... H04W 74/0833

FOREIGN PATENT DOCUMENTS

EP          3294013 A1    3/2018
EP          3337068 A1    6/2018
WO      2018/062832 A1    4/2018

OTHER PUBLICATIONS

Written Opinion of the International Searching Authority issued in corresponding International Application No. PCT/CN2020/131914, mailed Feb. 26, 2021, 4 pages.
"On Physical Layer Structure for NR sidelink", Agenda Item: 7.2.4.1, Source: China Telecom, 3GPP TSG RAN WG1 #97, R1-1906880, Reno, USA, May 13-17, 2019, 3 pages.
Extended European Search Report issued in corresponding European application No. 20892955.4, mailed Sep. 20, 2022.
Huawei et al., "Sidelink resource allocation mode 1", R1-1908041, 3GPP TSG RAN WG1 Meeting #98 Prague, Czech Republic, Aug. 26-30, 2019.
First Office Action issued in corresponding European Application No. 20892995.4, mailed Feb. 4, 2025, 4 pages.

* cited by examiner

METHOD FOR SIDELINK TRANSMISSION PARAMETER DETERMINATION, USER EQUIPMENT, AND COMPUTER READABLE MEDIUM

CROSS-REFERENCE TO RELATED APPLICATION

This is a continuation of International Application No. PCT/CN2020/131914, filed Nov. 26, 2020, which claims the priority of U.S. provisional application 62/940,388, the contents of which is incorporated herein by reference in its entirety.

TECHNICAL FIELD

The present disclosure relates to communication technology, in particular to SideLink (SL) transmission parameter determination.

BACKGROUND

The statements in this section merely provide information related to the present disclosure and may not constitute prior art. Further, the content in this section may be used to define a concept related to the present disclosure.

Sidelink (SL) communication is an adaptation of a conventional cell-based mobile communication system to allow direct communication between two or more nearby devices, as shown for an example in FIG. 1.

For SL communication, there are quite a few radio transmission parameters that a sidelink message transmitting-user equipment (Tx-UE) needs to determine before an actual SL transmission.

SUMMARY

Method, User Equipment, computer programs and a computer readable media for SideLink transmission parameter determination.

BRIEF DESCRIPTION OF THE DRAWINGS

The drawings are used merely for illustration purposes but not for limiting the present disclosure.

DETAILED DESCRIPTION

Figure 1:
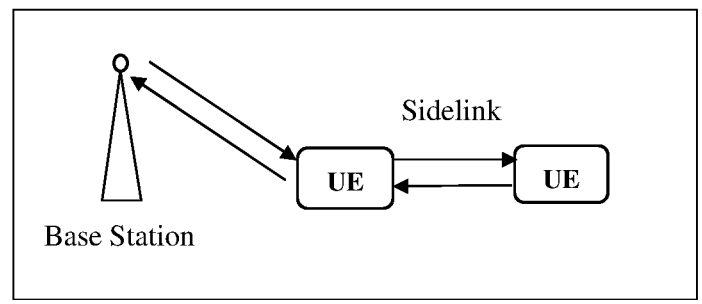
FIG. 1 shows an example of Sidelink communication.

In $5^{th}$ generation-new radio (5G-NR) sidelink (SL) communication, as an example, a sidelink message transmitting-user equipment (Tx-UE) needs to determine, before an actual SL transmission, one or more transmission parameters, including for example at least one of the followings: transmission timing(s), radio resource selection, SL transmission output power, size and format of sidelink control information, transport block size and modulation scheme. For some of these transmission parameters, their values/settings are determined by UE's internal upper communication layers and parsed down to the physical layers. However, for the remaining parameters, the Tx-UE needs to determine their values/settings in one or more other ways, for example, by receiving one or more parameters from a base station (such as an eNB or a gNB) through, e.g., a Radio Resource Control (RRC) message.

It is proposed a method for determining UE transmission parameter setting(s) in, for example, an NR sidelink communication, in which NR sidelink transmission parameter(s) that could be varied and determined based on an UE speed or a Doppler estimation including at least one of the followings:
Sidelink transmission output power level,
Modulation and coding scheme (MCS) level,
SL resource size in the frequency domain and/or in the time domain (e.g., a number of sub-channels),
Demodulation reference signal (DMRS) pattern.

For example, a base station, e.g., an eNB in an LTE system or a gNB in a 5G system, may determine at least two sets of UE SL transmission parameters in relation to the absolute speed of the UE, and then send to the UE the at least two sets of UE SL transmission parameters through an RRC message.

Optionally, the base station may determine a UE speed threshold, determine the at least two sets of UE SL transmission parameters in relation to the UE speed threshold, and send to the UE the UE speed threshold and the at least two sets of UE SL transmission parameters in relation to the UE speed threshold. The at least two sets of UE SL transmission parameters in relation to the UE speed threshold may comprise: a first set of UE SL transmission parameters for a situation when the absolute speed of the UE is above the UE speed threshold, and a second set of UE SL transmission parameters for a situation when the absolute speed of the UE is below the UE speed threshold. Each of the first and second sets of UE SL transmission parameters may include at least one of: an MCS level, an SL resource size, a sidelink transmission output power level, a DMRS pattern. The SL resource size may be a number of sub-channels, which may include at least one of: a minimal number of sub-channels, a maximum number of sub-channels. The MCS level may include at least one of: a minimum MCS value, a maximum MCS value.

In an example, the method may be performed by a UE. The UE, upon receiving, from a base station, an RRC message that includes at least two sets of UE SL transmission parameters in relation to the absolute speed of the UE, may determine, based on the absolute speed of the UE, which one of the at least two sets of UE SL transmission parameters is to be used for UE SL transmission.

Optionally, when the RRC message further comprises a UE speed threshold and when the at least two sets of UE SL transmission parameters in relation to the absolute speed of the UE are at least two sets of UE SL transmission parameters in relation to the UE speed threshold, the UE may determine, based on the absolute speed of the UE, which one of the at least two sets of UE SL transmission parameters in relation to the UE speed threshold is to be used for UE transmission.

For example, when the at least two sets of UE SL transmission parameters in relation to the UE speed threshold comprise: a first set of UE SL transmission parameters for a situation when the absolute speed of the UE is above the UE speed threshold and a second set of UE SL transmission parameters for a situation when the absolute speed of the UE is below the UE speed threshold, the UE may compare its absolute speed with the UE speed threshold.

For example, when the absolute speed of the UE is above the UE speed threshold, the UE may determine to use the first set of UE SL transmission parameters; when the absolute speed of the UE is below the UE speed threshold, the UE may determine to use the second set of UE SL transmission parameters; and when the absolute speed of the UE is equal to the UE speed threshold, either the first set of UE SL transmission parameters or the second set UE SL transmission parameters may be used.

The determination of the speed may be based on Tx-UE's self-absolute travelling speed (e.g. km/hour) or relative speed between the Tx-UE and a target receiving-UE (Rx-UE) (e.g. km/hour or measurement/estimation of Doppler spread).

Alternatively, as an example, the use of Tx-UE's absolute travelling speed or relative speed between the Tx-UE and target Rx-UEs to determine Tx-UE's transmission parameters could be dependent on transmission cast type and/or whether the knowledge of number of UEs in a SL communication group (i.e., group size) is known to the Tx-UE for the intended message transmission.

For example, if the message transmission is intended for a specific group of UEs and the group size is known to the Tx-UE (e.g. unicast of one Rx-UE or groupcast of more than one Rx-UEs), the Tx-UE may use the relative speed to determine one or more of the above mentioned sidelink transmission parameter(s).

For example, if the number of intended target Rx-UEs is not known to the Tx-UE (e.g. broadcast communication or connectionless groupcast SL), then the Tx-UE may use its own absolute travelling speed to determine one or more of the above mentioned sidelink transmission parameter(s).

One benefit of using Tx-UE's self-absolute travelling speed to determine one or more of the above mentioned sidelink transmission parameter(s) is that it is difficult for the Tx-UE to estimate/measure the travelling speed or Doppler spread of surrounding UEs for example when the Tx-UE is not aware of any nearby receiver UEs that will try to decode its message(s) when the message transmission is intended for a broadcast. In this case, one or more of the Tx-UE's transmission parameters could be based on UE's travelling speed (e.g. absolute speed).

For example, when a Tx-UE (which could be a vehicle UE) is travelling at 120 km/hr, it could use this speed or twice of this speed (to account for vehicle UEs travelling at an opposite direction) to determine its transmission parameter setting(s).

On the other hand, one benefit of using the relative speed between the Tx-UE and its intended target Rx-UE(s) is to account for UEs that are travelling together. In this type of cases, their absolute speed could be high but their relative speed can be very low.

For example, in vehicle platooning where one car/truck is following closely behind of another car/truck, their typical travelling speed can be very high on a highway (e.g. 120 km/hour) to take advantage of the nature of aero-dynamic but their relative speed is close to zero. Another typical example would be a group of smartphone type of UEs playing augmented reality (AR)/virtual reality (VR) gaming together and exchanging gaming data between them on a moving train. In this case again their absolute speed is very high but their relative speed is essentially none. If their sidelink transmission power is determined based on their absolute speed, they would all be transmitting at the maximum power even that they are all sitting right next to each other. However, if the relative speed is used in this case to determine their transmission powers, they would significantly save UE power. Consequently, these UEs could enjoy playing their games for longer.

In addition, it is provided UE that is configured to perform one of the above methods.

Figure 2:
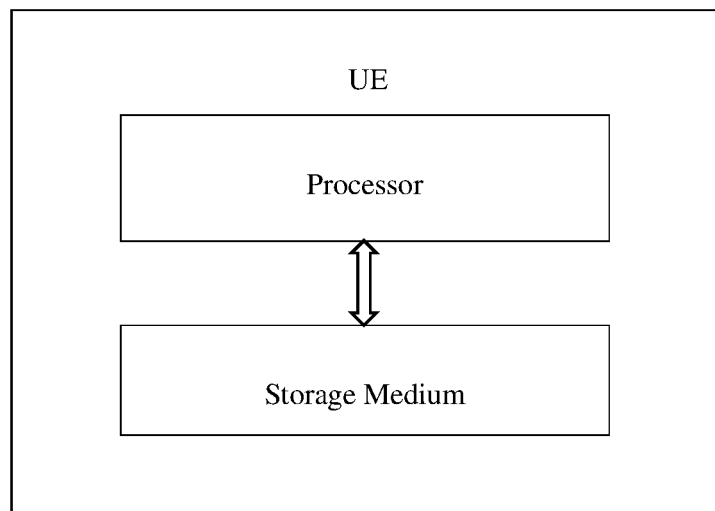
FIG. 2 shows an example of UE.

The UE may comprise one or more storage medium storing computer readable instructions, and one or more computing processors configured to execute the computer readable instructions for performing one of the above methods, for example as shown in FIG. 2.

The UE may comprise a plurality of means or modules, each means or module is configured to perform one or more of method steps to complete one of above methods.

It is provided a computer program, comprising instructions, when executed by user equipment, for causing the user equipment to perform one of the above methods.

It is provided a computer readable medium, comprising instructions for causing a user equipment to perform one of the above methods.

Clauses

1. A method for SideLink (SL) transmission parameter determination, comprising:
   determining one or a plurality of transmission parameters for User Equipment (UE) based on an absolute speed of the UE.
2. The method of clause 1, wherein the one or the plurality of transmission parameters comprise at least one of: a Modulation and Coding Scheme (MCS) level, a SL resource size, a sidelink transmission output power level, a DeModulation Reference Signal (DMRS) pattern.
3. The method of clause 2, wherein the SL resource size is a number of sub-channels.
4. The method of any one of clauses 1 to 3, being performed by the UE and further comprising:
   receiving, from a base station, a Radio Resource Control (RRC) message that includes at least two sets of UE SL transmission parameters in relation to the absolute speed of the UE;
   wherein
   the step of determining one or a plurality of transmission parameters for the UE based on the absolute speed of the UE comprises:
   determining, based on the absolute speed of the UE, which one of the at least two sets of UE SL transmission parameters in relation to the absolute speed of the UE is to be used for UE transmission.
5. The method of clause 4, wherein
   the RRC message further comprises a UE speed threshold;
   the at least two sets of UE SL transmission parameters in relation to the absolute speed of the UE are at least two sets of UE SL transmission parameters in relation to the UE speed threshold; and
   the step of determining, based on the absolute speed of the UE, which one of the at least two sets of UE SL transmission parameters in relation to the absolute speed of the UE is to be used for UE transmission comprises:
   determining, based on the absolute speed of the UE, which one of the at least two sets of UE SL transmission parameters in relation to the UE speed threshold is to be used for UE transmission.
6. The method of clause 5, wherein
   the at least two sets of UE SL transmission parameters in relation to the UE speed threshold comprise:
   a first set of UE SL transmission parameters for a situation when the absolute speed of the UE is above the UE speed threshold; and
   a second set of UE SL transmission parameters for a situation when the absolute speed of the UE is below the UE speed threshold.

7. The method of clause 6, wherein
each of the first and second sets of UE SL transmission parameters includes at least one of: the Modulation and Coding Scheme (MC S) level, the SL resource size, the sidelink transmission output power level, the DeModulation Reference Signal (DMRS) pattern.

8. The method of clause 7, wherein
the SL resource size is the number of sub-channels, which includes at least one of: a minimal number of sub-channels, a maximum number of sub-channels.

9. The method of clause 7 or 8, wherein
the MCS level includes at least one of: a minimum MCS value, a maximum MCS value.

10. The method of clause 7 or 8 or 9, wherein
the sidelink transmission output power level includes: a maximum transmission power.

11. The method of any one of clauses 4 to 10, wherein the base station is an eNB for a Long Term Evolution (LTE) system or a gNB for $5^{th}$ Generation (5G) system.

12. User equipment (UE), configured to perform the method of any one of clauses 4 to 11.

13. User equipment, comprising one or more storage medium storing computer readable instructions, and one or more computing processors configured to execute the computer readable instructions for performing the method of any one of clauses 4 to 11.

14. A computer program, comprising instructions, when executed by user equipment, for causing the user equipment to perform the method according to any one of clauses 4 to 11.

15. A computer readable medium, comprising instructions, when executed by User Equipment (UE), causing the UE to perform the method of any one of clauses 4 to 11.

16. UE, comprising:
determining means adapted for determining one or a plurality of SideLink (SL) transmission parameters for UE based on an absolute speed of the UE.

17. The UE of clause 16, wherein the one or the plurality of SL transmission parameters comprise at least one of: a Modulation and Coding Scheme (MCS) level, a SL resource size, a sidelink transmission output power level, a DeModulation Reference Signal (DMRS) pattern.

18. The UE of clause 17, wherein the SL resource size is a number of sub-channels.

19. The UE of any one of clauses 16 to 18, further comprising:
receiving means adapted for receiving, from a base station, a Radio Resource Control (RRC) message that includes at least two sets of UE SL transmission parameters in relation to the absolute speed of the UE;
wherein the determining means is adapted for determining, based on the absolute speed of the UE, which one of the at least two sets of UE SL transmission parameters in relation to the absolute speed of the UE is to be used for UE transmission.

20. The UE of clause 18, wherein the RRC message further comprises a UE speed threshold, and the at least two sets of UE SL transmission parameters in relation to the absolute speed of the UE are at least two sets of UE SL transmission parameters in relation to the UE speed threshold; and
the determining means is adapted for determining, based on the absolute speed of the UE, which one of the at least two sets of UE SL transmission parameters in relation to the UE speed threshold is to be used for UE transmission.

21. The UE of clause 20, wherein
the at least two sets of UE SL transmission parameters in relation to the UE speed threshold comprise:
a first set of UE SL transmission parameters for a situation when the absolute speed of the UE is above the UE speed threshold; and
a second set of UE SL transmission parameters for a situation when the absolute speed of the UE is below the UE speed threshold.

22. The UE of clause 21, wherein
each of the first and second sets of UE SL transmission parameters includes at least one of: the Modulation and Coding Scheme (MC S) level, the SL resource size, the sidelink transmission output power level, the DeModulation Reference Signal (DMRS) pattern.

23. The UE of clause 22, wherein
the SL resource size is the number of sub-channels, which includes at least one of: a minimal number of sub-channels, a maximum number of sub-channels.

24. The UE of clause 22 or 23, wherein
the MCS level includes at least one of: a minimum MCS value, a maximum MCS value.

25. The UE of clause 22 or 23 or 24, wherein
the sidelink transmission output power level includes: a maximum transmission power.

It should be understood that the invention is not limited by any of the details of the foregoing description, but rather should be construed broadly based on the principle as defined in the appended claims. Therefore, all changes and modifications that fall within the scope of the claims, or equivalences thereof are intended to be embraced by the scope of protection.

What is claimed is:

1. A method for SideLink (SL) transmission parameter determination, comprising:
receiving, from a base station, a Radio Resource Control (RRC) message that comprises at least two sets of UE SL transmission parameters in relation to an absolute speed of the UE, wherein the at least two sets of UE SL transmission parameters in relation to the absolute speed comprise:
a first set of UE SL transmission parameters for a situation when the absolute speed of the UE is above a UE speed threshold; and
a second set of UE SL transmission parameters for a situation when the absolute speed of the UE is below the UE speed threshold;
wherein each of the first and second sets of UE SL transmission parameters comprises a minimal number of sub-channels and a maximum number of sub-channels, and a sidelink transmission output power level, wherein the sidelink transmission output power level comprises a maximum transmission power;
determining one or a plurality of transmission parameters for User Equipment (UE) based on the absolute speed of the UE,
wherein the one or the plurality of transmission parameters comprise at least one of:
a SL resource size, the sidelink transmission output power level, and a Modulation and Coding Scheme (MCS) level, wherein the SL resource size is a number of sub-channels.

2. The method of claim 1, wherein determining one or a plurality of transmission parameters for the UE based on the absolute speed of the UE comprises:
determining, based on the absolute speed of the UE, which one of the at least two sets of UE SL transmission parameters in relation to the absolute speed of the UE is to be used for UE transmission.

3. The method of claim 2, wherein the RRC message further comprises the UE speed threshold;

the at least two sets of UE SL transmission parameters in relation to the absolute speed of the UE are at least two sets of UE SL transmission parameters in relation to the UE speed threshold; and determining, based on the absolute speed of the UE, which one of the at least two sets of UE SL transmission parameters in relation to the absolute speed of the UE is to be used for UE transmission comprises:

determining, based on the absolute speed of the UE, which one of the at least two sets of UE SL transmission parameters in relation to the UE speed threshold is to be used for UE transmission.

4. The method of claim 1, wherein each of the first and second sets of UE SL transmission parameters further includes at least one of: the Modulation and Coding Scheme (MCS) level, the DeModulation Reference Signal (DMRS) pattern.

5. The method of claim 4, wherein the MCS level includes at least one of: a minimum MCS value, a maximum MCS value.

6. A non-transitory computer readable medium, comprising instructions, when executed by User Equipment (UE), causing the UE to perform:

receiving, from a base station, a Radio Resource Control (RRC) message that comprises at least two sets of UE SL transmission parameters in relation to an absolute speed of the UE, wherein the at least two sets of UE SL transmission parameters in relation to the absolute speed comprise:

a first set of UE SL transmission parameters for a situation when the absolute speed of the UE is above a UE speed threshold; and a second set of UE SL transmission parameters for a situation when the absolute speed of the UE is below the UE speed threshold;

wherein each of the first and second sets of UE SL transmission parameters comprises a minimal number of sub-channels and a maximum number of sub-channels, and a sidelink transmission output power level, wherein the sidelink transmission output power level comprises a maximum transmission power;

determining one or a plurality of SideLink (SL) transmission parameters for UE based on the absolute speed of the UE, wherein the one or the plurality of transmission parameters comprise at least one of:

a SL resource size, the sidelink transmission output power level, and a Modulation and Coding Scheme (MCS) level, wherein the SL resource size is a number of sub-channels.

7. A user equipment (UE), comprising:

one or more storage medium storing computer readable instructions, and one or more computing processors configured to execute the computer readable instructions for performing:

receiving, from a base station, a Radio Resource Control (RRC) message that comprises at least two sets of UE SL transmission parameters in relation to an absolute speed of the UE, wherein the at least two sets of UE SL transmission parameters in relation to the absolute speed comprise:

a first set of UE SL transmission parameters for a situation when the absolute speed of the UE is above a UE speed threshold; and a second set of UE SL transmission parameters for a situation when the absolute speed of the UE is below the UE speed threshold;

wherein each of the first and second sets of UE SL transmission parameters comprises a minimal number of sub-channels and a maximum number of sub-channels, and a sidelink transmission output power level, wherein the sidelink transmission output power level comprises a maximum transmission power;

determining one or a plurality of SideLink (SL) transmission parameters for UE based on the absolute speed of the UE, wherein the one or the plurality of SL transmission parameters comprise at least one of: a SL resource size, the sidelink transmission output power level, and a Modulation and Coding Scheme (MCS) level, wherein the SL resource size is a number of sub-channels.

8. The UE of claim 7, wherein the one or more computing processors are further configured to:

determine, based on the absolute speed of the UE, which one of the at least two sets of UE SL transmission parameters in relation to the absolute speed of the UE is to be used for UE transmission.

9. The UE of claim 7, wherein the RRC message further comprises the UE speed threshold, and the at least two sets of UE SL transmission parameters in relation to the absolute speed of the UE are at least two sets of UE SL transmission parameters in relation to the UE speed threshold; and the one or more computing processors are further configured to determine, based on the absolute speed of the UE, which one of the at least two sets of UE SL transmission parameters in relation to the UE speed threshold is to be used for UE transmission.

10. The UE of claim 7, wherein each of the first and second sets of UE SL transmission parameters further includes at least one of: the Modulation and Coding Scheme (MCS) level, the DeModulation Reference Signal (DMRS) pattern.

11. The UE of claim 10, wherein the MCS level includes at least one of: a minimum MCS value, a maximum MCS value.

* * * * *